United States Patent
Kulkarni et al.

(10) Patent No.: US 11,624,547 B2
(45) Date of Patent: Apr. 11, 2023

(54) BIN ATTACHMENT ASSEMBLY FOR A TRIM BREAKER

(71) Applicant: WHIRLPOOL CORPORATION, Benton Harbor, MI (US)

(72) Inventors: Mandar Gopalkrushna Kulkarni, Pune (IN); Vishal Shankar Marathe, Pune (IN); Abhay Naik, Stevensville, MI (US); Gaurav Ramesh Shete, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 17 days.

(21) Appl. No.: 17/346,460

(22) Filed: Jun. 14, 2021

(65) Prior Publication Data

US 2022/0397333 A1 Dec. 15, 2022

(51) Int. Cl.
*F25D 23/00* (2006.01)
*F25D 23/02* (2006.01)
*F25D 23/06* (2006.01)

(52) U.S. Cl.
CPC ......... *F25D 23/028* (2013.01); *F25D 23/066* (2013.01)

(58) Field of Classification Search
CPC .............................. F25D 23/028; F25D 23/066
USPC ................... 312/405.1, 405, 321.5
See application file for complete search history.

(56) References Cited

U.S. PATENT DOCUMENTS

| | | | |
|---|---|---|---|
| 2,665,456 A | 1/1954 | Morton | |
| 4,859,010 A | 8/1989 | Jeziorowski | |
| 5,520,453 A | 5/1996 | Aoki et al. | |
| 6,908,163 B1 | 6/2005 | Hebeler et al. | |
| 7,210,308 B2 | 5/2007 | Tanimoto et al. | |
| 7,886,559 B2 | 2/2011 | Hell et al. | |
| 8,083,985 B2 | 12/2011 | Luisi et al. | |
| 8,871,323 B2 | 10/2014 | Kim et al. | |
| 9,170,046 B2 | 10/2015 | Jung et al. | |
| 9,885,202 B2 | 2/2018 | Laible | |
| 10,451,338 B2 | 10/2019 | Cordero et al. | |
| 10,544,984 B2 | 1/2020 | Park et al. | |
| 2006/0250063 A1* | 11/2006 | Czach | A47B 88/60 312/405.1 |
| 2011/0146335 A1 | 6/2011 | Jung et al. | |
| 2014/0346942 A1 | 11/2014 | Kim et al. | |
| 2015/0330700 A1* | 11/2015 | Celik | F25D 25/02 312/405.1 |

(Continued)

FOREIGN PATENT DOCUMENTS

DE 3505758 A1 8/1985
EP 2936012 A1 10/2015

(Continued)

*Primary Examiner* — Janet M Wilkens
(74) *Attorney, Agent, or Firm* — Price Heneveld LLP (57) ABSTRACT

A bin attachment assembly for a vacuum insulated door includes a trim breaker that includes a frame and at least one engagement feature. The frame defines an aperture in which the at least one engagement feature is disposed. The bin attachment assembly further includes at least one locking feature that is selectively coupled to the trim breaker via the at least one engagement feature. The at least one locking feature includes a tapered body and a projection that extends from an end of the tapered body. The bin attachment assembly further includes a bin that is coupled to the trim breaker via the at least one locking feature.

15 Claims, 9 Drawing Sheets

(56) References Cited

U.S. PATENT DOCUMENTS

2018/0311884 A1 11/2018 Allard et al.
2020/0141628 A1* 5/2020 Krishna ................ F25D 23/066
2020/0348072 A1 11/2020 Allard et al.

FOREIGN PATENT DOCUMENTS

| EP | 2952838 | A1 | | 12/2015 |
|----|---------|----|---|---------|
| EP | 3734165 | | * | 11/2020 |
| GB | 1493362 | A | | 11/1977 |
| KR | 20100022742 | A | | 3/2010 |
| WO | 2017023088 | A1 | | 2/2017 |
| WO | 2017102121 | A1 | | 11/2017 |
| WO | 2018063182 | A1 | | 4/2018 |
| WO | 2018070996 | A1 | | 4/2018 |
| WO | 2018151704 | A1 | | 8/2018 |
| WO | 2021213199 | | * | 10/2021 |

* cited by examiner

BIN ATTACHMENT ASSEMBLY FOR A TRIM BREAKER

BACKGROUND OF THE DISCLOSURE

The present disclosure generally relates to a trim breaker for an insulated structure, and more specifically, to a bin attachment assembly for a trim breaker of an insulated structure.

SUMMARY OF THE DISCLOSURE

According to one aspect of the present disclosure, a vacuum insulated door for an appliance includes a first panel, a second panel that is operably coupled to the first panel to define an insulating cavity, and a trim breaker that is operably coupled to each of the first panel and the second panel. The trim breaker includes a frame and an engagement feature. The engagement feature includes an angular side and a base portion. The vacuum insulated door further includes a bin that is operably coupled to the trim breaker proximate to the second panel. The bin includes a locking feature that is selectively coupled to the engagement feature. The locking feature includes a body and a projection that extends from an end of the body.

According to another aspect of the present disclosure, a vacuum insulated structure includes a first panel and a second panel. The first panel is coupled to the second panel to define an insulating cavity. A trim breaker is operably coupled to each of the first panel and a second panel. The trim breaker includes a first engagement feature and a second engagement feature. A space is defined proximate each of the first engagement feature and the second engagement feature. The first engagement feature and the second engagement feature each include an angular side and a base portion. A first locking feature is at least partially disposed within the space defined by the first engagement feature and is operably coupled to the first engagement feature. A second locking feature is at least partially disposed within the space defined by the second engagement feature and is operably coupled to the second engagement feature. The first locking feature and the second locking feature are configured to couple a bin to the trim breaker.

According to yet another aspect of the present disclosure, a bin attachment assembly for a vacuum insulated door includes a trim breaker that includes a frame and at least one engagement feature. The frame defines an aperture in which the at least one engagement feature is disposed. The bin attachment assembly further includes at least one locking feature that is selectively coupled to the trim breaker via the at least one engagement feature. The at least one locking feature includes a tapered body and a projection that extends from an end of the tapered body. The bin attachment assembly further includes a bin that is coupled to the trim breaker via the at least one locking feature.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a bin attachment assembly for a trim breaker. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
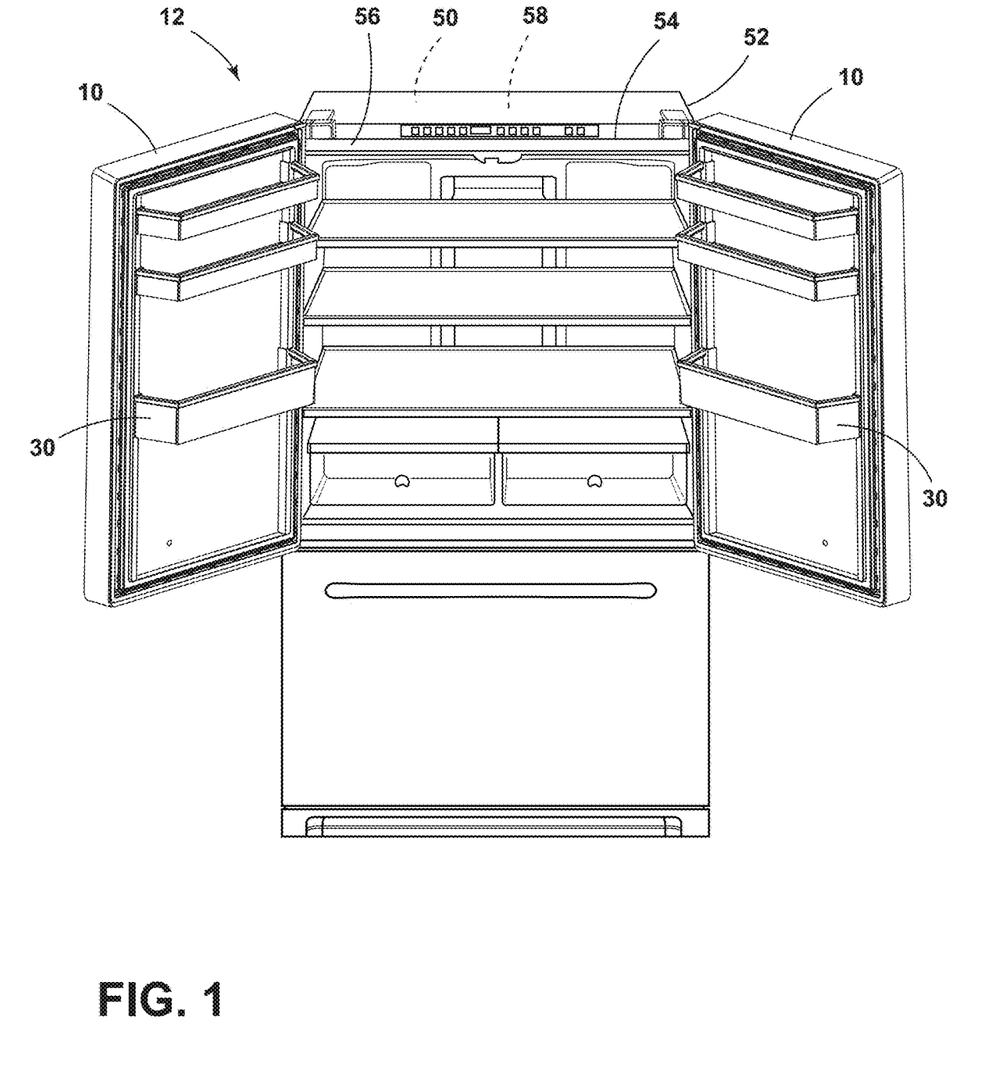
FIG. 1 is a front perspective view of an appliance of the present disclosure.
Figure 2:
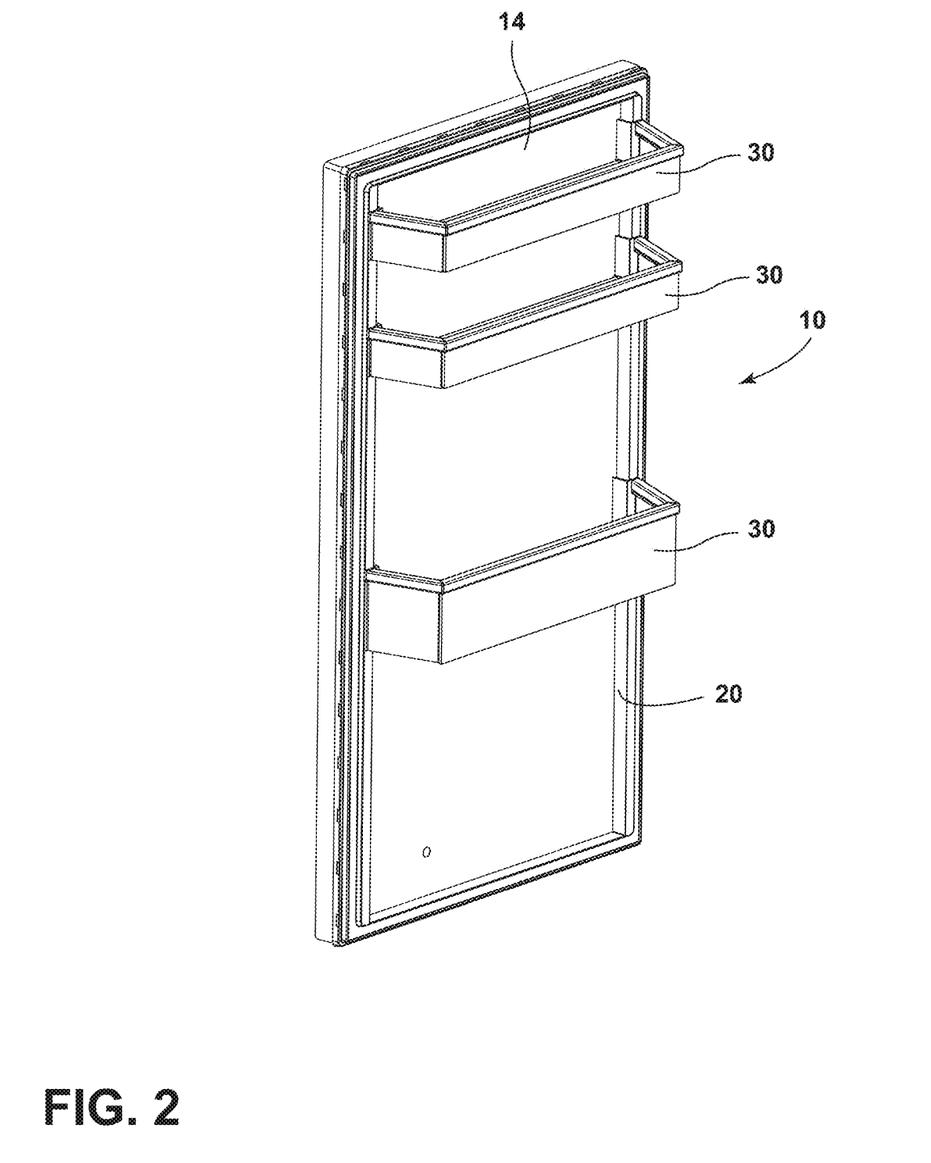
FIG. 2 is a top perspective view of a vacuum insulated door of the present disclosure with a plurality of bins.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-12, reference numeral 10 generally designates a vacuum insulated door 10 for an appliance 12 that includes a first panel 14 and a second panel 16. The second panel 16 is operably coupled to the first panel 14 to define an insulating cavity 18. A trim breaker 20 is operably coupled to each of the first panel 14 and the second panel 16, and the trim breaker 20 includes a frame 22 and an engagement feature 24. The engagement feature 24 includes an angular side 26 and a base portion 28. A bin 30 is operably coupled to the trim breaker 20 proximate to the second panel 16 and includes a locking feature 32 selectively coupled to the engagement feature 24 of the trim breaker 20. The locking feature 32 includes a body 34 and a projection 36 extending from an end 38 of the body 34.

Referring now to FIGS. 1-4, the appliance 12 is illustrated as a refrigerator. It is also contemplated that the vacuum insulated door 10 described herein can be used with a variety of appliances. In addition to the vacuum insulated door 10, the appliance 12 may be formed from a vacuum insulated structure 50, which is generally formed using a similar process as the formation of the vacuum insulated door 10. For example, the vacuum insulated structure 50 may include a wrapper 52 and a liner 54 operably coupled via a structural trim breaker 56 similar to the trim breaker 20, described below. The wrapper 52 and the liner 54 also define an insulating cavity 58 similar to the insulating cavity 18 defined between the first panel 14 and the second panel 16, mentioned above. It is generally contemplated that the wrapper 52, the liner 54, and the first and second panels 14, 16 are formed from a metallic material, which minimizes potential exposure of the insulating cavities 18, 58 to air molecules. Stated differently, the wrapper 52, the liner 54, and the first and second panels 14, 16 can minimize the potential outgassing of each insulating cavity 18, 58 as a result of the metallic material.

The vacuum insulated door 10 is illustrated with the first panel 14 coupled to the second panel 16 via the trim breaker 20. The first panel 14 and the second panel 16 each have an interior surface 60 and an exterior surface 62. It is generally contemplated that the interior surface 60 of each of the first and second panels 14, 16 at least partially defines the insulating cavity 18 in which insulation materials 64 are disposed. The insulating cavity 18 may be filled with insulation materials 64 that may be a glass type material, a carbon-based powder, silicone oxide-based materials, insulating gases, and other standard insulation materials known in the art. The insulation materials 64 substantially fill the insulating cavity 18 forming a substantially continuous layer between the first panel 14 and the second panel 16. It is contemplated that the insulating cavity 58 defined by the vacuum insulated structure 50 may be similarly configured. The insulating cavity 18 is sealed and further defined by the trim breaker 20. It is generally contemplated that the trim breaker 20 is formed from a polymeric material, such as plastic. The trim breaker 20 is configured to assist in the maintenance of an at least partial vacuum that is defined within the insulating cavity 18.

Figure 3:
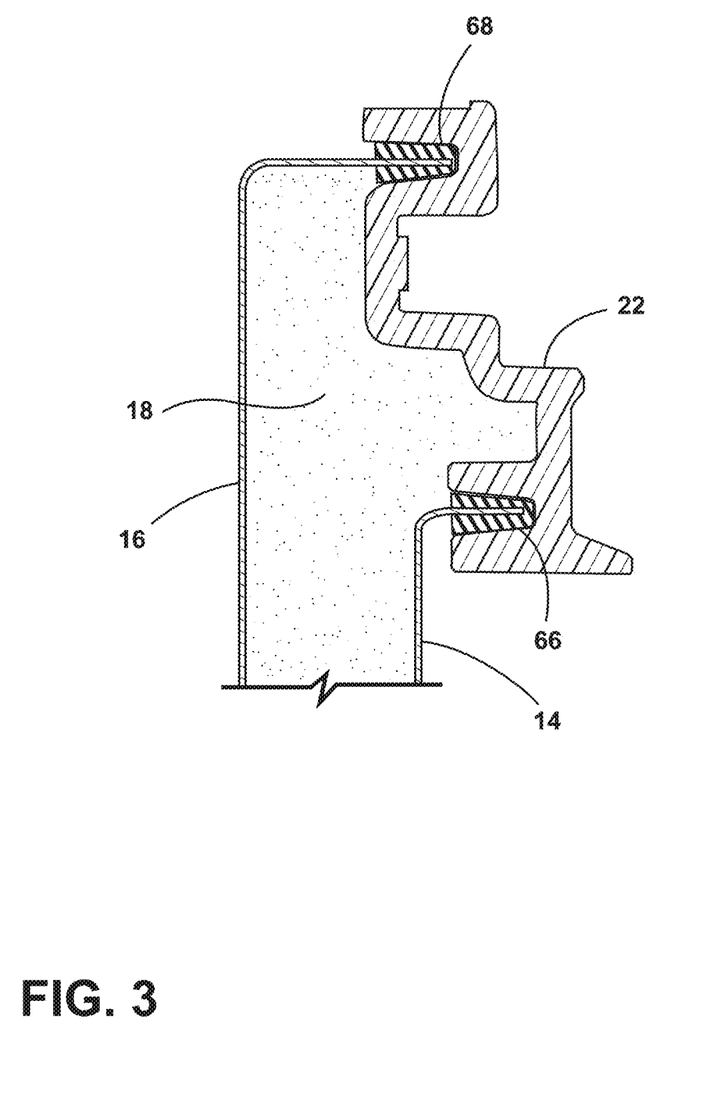
FIG. 3 is a side cross-sectional view of a trim breaker frame engaged with panels of a vacuum insulated door.

The frame 22 of the trim breaker 20 may also define a first groove 66 and a second groove 68 in which the first and second panels 14, 16 may be disposed, respectively. It is generally contemplated that the first and second panels 14, 16 are retained within the first and second grooves 66, 68, respectively via an adhesive or other binding material. The trim breaker 20 is configured to assist in maintaining the overall configuration of the vacuum insulated door 10 and to assist in maintaining the vacuum defined within the vacuum insulated door 10. By way of example, not limitation, the trim breaker 20 may assist in minimizing the overall outgassing of the insulating cavity 18 to extend the useful life of the vacuum insulated door 10.

As described in more detail below, the frame 22 of the trim breaker 20 is configured with a plurality of apertures 70. The frame 22 is configured to cooperate with a bin attachment assembly 72, described below. Additionally or alternatively, the frame 22 and the trim breaker 20 may be part of the bin attachment assembly 72, such that the bin 30 is coupled with at least the first panel 14 via the frame 22 of the trim breaker 20. The bin attachment assembly 72 is described in more detail below.

Figure 4:
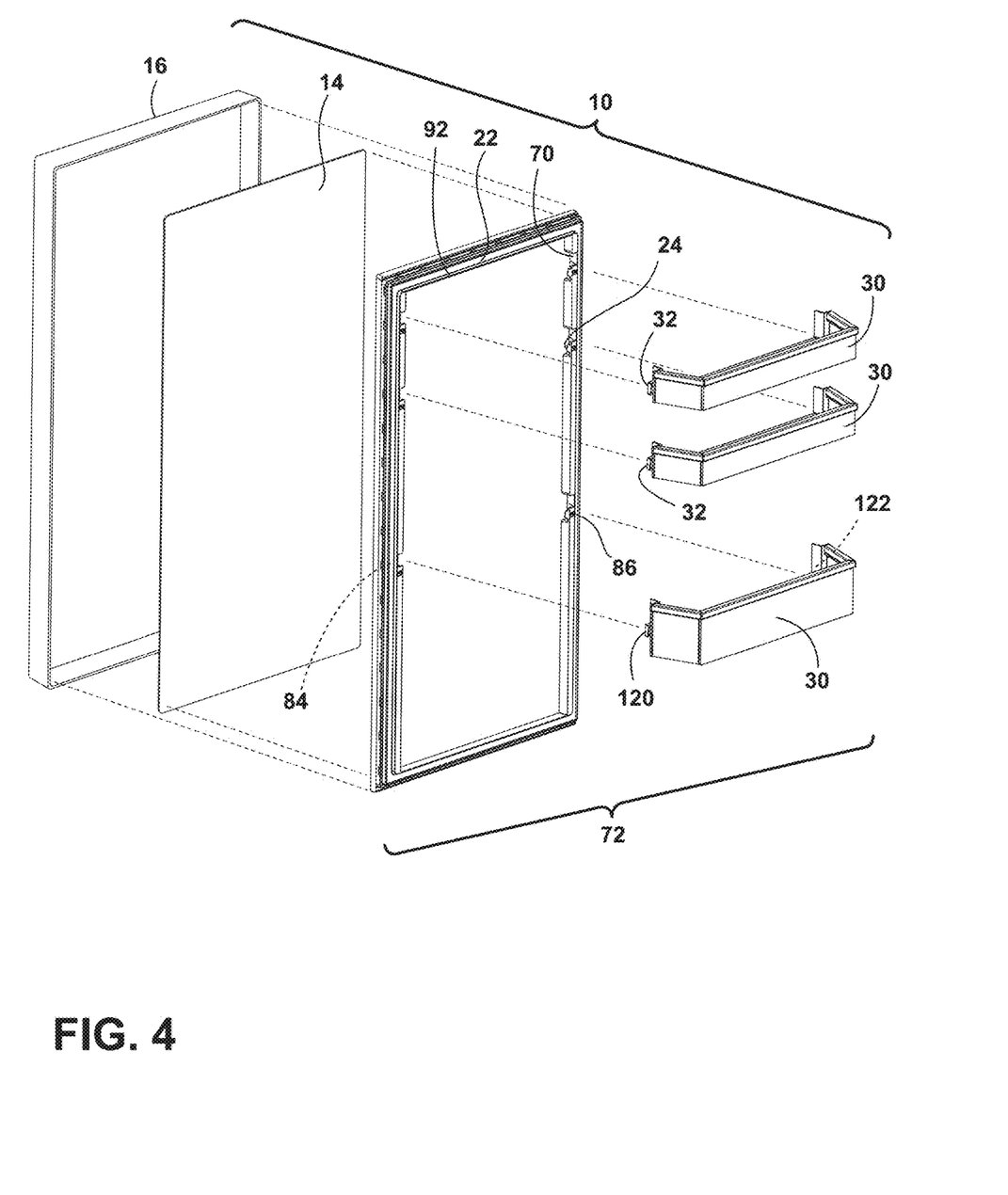
FIG. 4 is an exploded view of a vacuum insulated door of the present disclosure.
Figure 5:
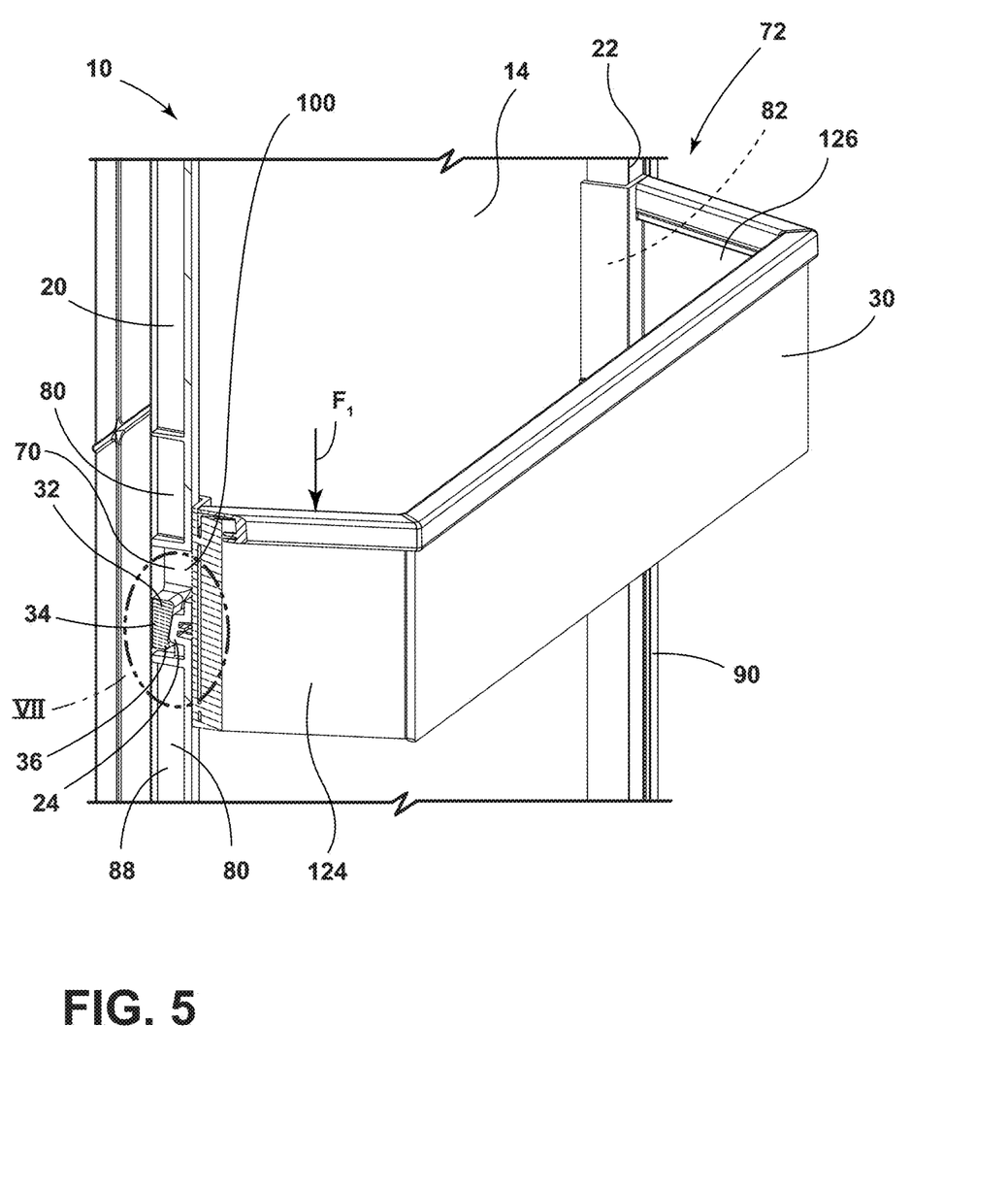
FIG. 5 is an enlarged partial side cross-sectional view of a bin attachment assembly of the present disclosure with a bin uncoupled from a trim breaker.
Figure 6:
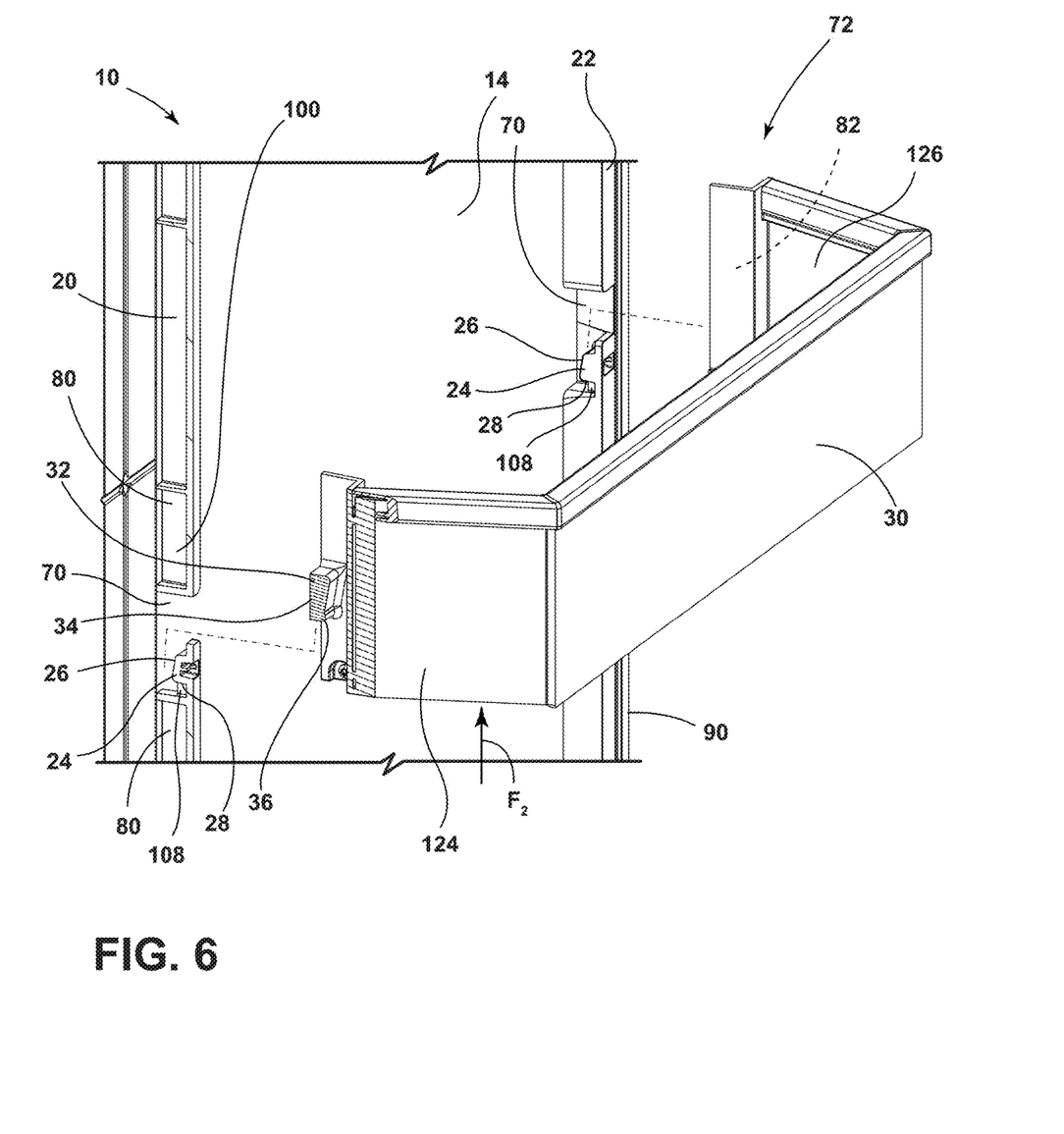
FIG. 6 is an enlarged partial side cross-sectional view of the bin attachment assembly of FIG. 5 with the bin coupled to the trim breaker.

Referring now to FIGS. 4-6, the bin 30 is illustrated as being coupled to the trim breaker 20 of the vacuum insulated door 10. It is generally contemplated that a plurality of bins 30 may be coupled to the trim breaker 20, such that the trim breaker 20 can define a plurality of engagement features 24 to accommodate the locking features 32 defined by each respective bin 30. The coupling configuration of the bins 30 and the trim breaker 20 is described in more detail below. As mentioned above, the trim breaker 20 defines the plurality of apertures 70 in which the engagement feature 24 is defined. It is generally contemplated that the trim breaker 20 defines at least a first aperture 80 and a second aperture 82 in which a first engagement feature 84 and a second engagement feature 86 are respectively defined. In at least one configuration, the first apertures 80 of the trim breaker 20 can be defined along a first side 88 of the trim breaker 20, and the second apertures 82 can be defined along a second side 90 of the trim breaker 20.

Stated differently, the first and second apertures 80, 82 are defined along the first and second sides 88, 90 of the frame 22 of the trim breaker 20. The frame 22 is formed by the first side 88 and the second side 90 of the trim breaker 20 as well as a top side 92 and a bottom side 94. As mentioned above, the engagement features 24 are defined by the frame 22, such that the engagement feature 24 can be integrally formed with the trim breaker 20. The engagement features 24 may generally be described as being defined on the first and second sides 88, 90 of the frame 22. Additionally or alternatively, the engagement features 24 may be defined on the top side 92 and/or the bottom side 94 of the frame 22.

With reference now to FIGS. 5-8, the bin attachment assembly 72 is illustrated in an enlarged cross-sectional view to at least partially illustrate the engagement features 24 and the locking feature 32 within one of the plurality of apertures 70. For purposes of simplicity, a single side of each of the trim breaker 20 and the bin attachment assembly 72 is described, such that the features and configuration described herein may apply regardless of the location of the bin 30 along the trim breaker 20. For example, the bin 30 is described herein with emphasis on a single locking feature 32 that couples to a single engagement feature 24. Stated differently, the engagement and locking features 24, 32 are configured in a similar manner regardless of the location along the trim breaker 20 and the bin 30. The descriptions of the engagement and locking features 24, 32 generally describes the overall configuration and function of the bin attachment assembly 72 and/or bin attachment assemblies 72 of the present disclosure. The bin attachment assembly 72 includes, at least, the engagement feature 24 within the frame 22 and the locking features 32 of the bin 30. The aperture 70 defined by the frame 22 is accessible via an opening 100, such that the engagement features 24 are positioned proximate the opening 100 within the apertures 70.

Figure 7:
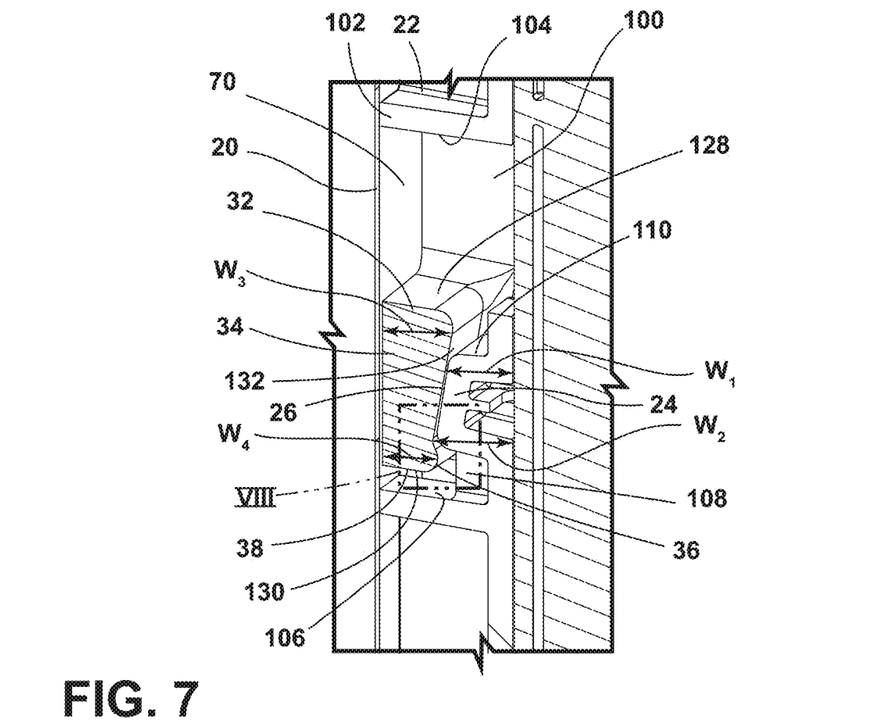
FIG. 7 is an enlarged partial cross-sectional view of a bin attachment assembly of the present disclosure.

The apertures 70 are defined by perimeter walls 102, as illustrated in the cross-section of the trim breaker 20 in FIG. 7. The enlarged view of the aperture 70 and the engagement feature 24 in FIG. 7 illustrates a top perimeter wall 104 and a bottom perimeter wall 106 of the aperture 70. The opening 100 is defined proximate to the top perimeter wall 104 of the aperture 70, and the engagement feature 24 defines a space 108 proximate to the bottom perimeter wall 106 of the aperture 70. Stated differently, the engagement feature 24 defines the space 108 beneath the base portion 28 and proximate the bottom perimeter wall 106 of the aperture 70. As mentioned above, the engagement feature 24 includes the angular side 26 and the base portion 28.

Referring still to FIGS. 5-8, the engagement feature 24 also includes a top portion 110 on an opposing end from the base portion 28. The top portion 110 of the engagement feature 24 at least partially defines the opening 100 of the frame 22 of the trim breaker 20 to provide access to the aperture 70 and engagement feature 24. It is generally contemplated that the engagement feature 24 is integrally formed with the frame 22 of the trim breaker 20, such that the engagement feature 24 may be molded or otherwise formed during the formation process of the trim breaker 20. The angular side 26 of the engagement feature 24 is generally configured such that the engagement feature 24 tapers from the base portion 28 toward the top portion 110. Stated differently, the top portion 110 may have a width $W_1$ that is less than a width $W_2$ of the base portion 28, such that the base portion 28 may generally extend past the top portion 110 in a cross-sectional view.

With further reference to FIGS. 5-8, the locking feature 32 of the bin 30 is illustrated as being coupled with the engagement feature 24, described further below. As mentioned above with respect to the first and second engagement features 84, 86, it is also contemplated that the locking feature 32 may have corresponding first and second locking features 120, 122 (FIG. 4) disposed on a first side panel 124 and a second side panel 126 of the bin 30, respectively. The construction described herein with respect to the locking feature 32 may apply to both the first and second locking features 120, 122. The locking feature 32 includes the body 34 and the projection 36. The locking feature 32 also includes a first end 128 and a second end 130, such that the body 34 is defined by the first end 128 and the second end 130 of the locking feature 32. As illustrated in FIG. 7, the first end 128 of the locking feature 32 has a width $W_3$ that is greater than a width $W_4$ of the second end 130 of the locking feature 32. Stated differently, the body 34 of the locking feature 32 has a generally tapered configuration between the first end 128 and the second end 130. The tapered configuration of the body 34 generally cooperates with the tapered configuration of the engagement feature 24.

Figure 8:
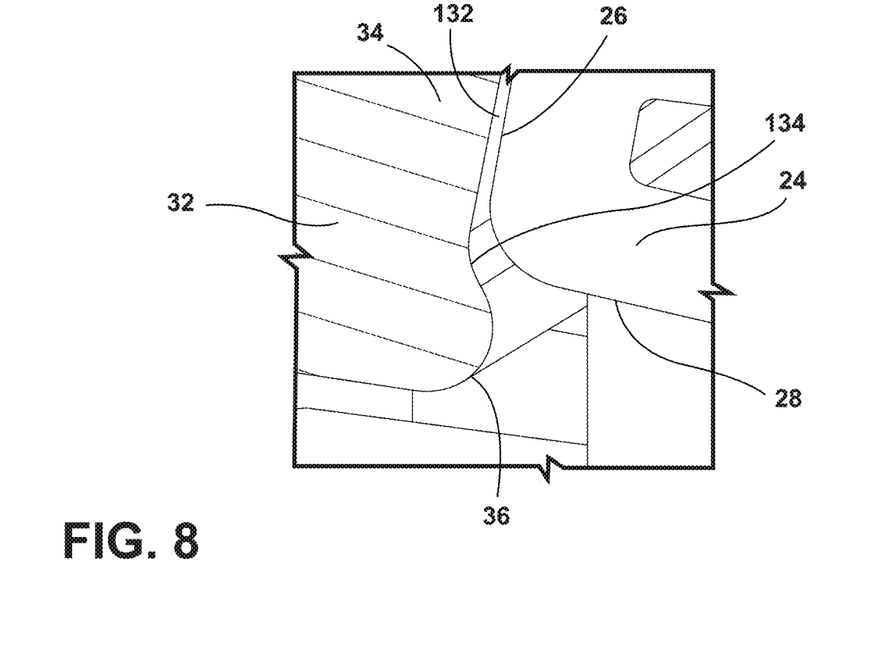
FIG. 8 is an enlarged partial cross-sectional view of a locking feature and an engagement feature of the present disclosure.
Figure 9:
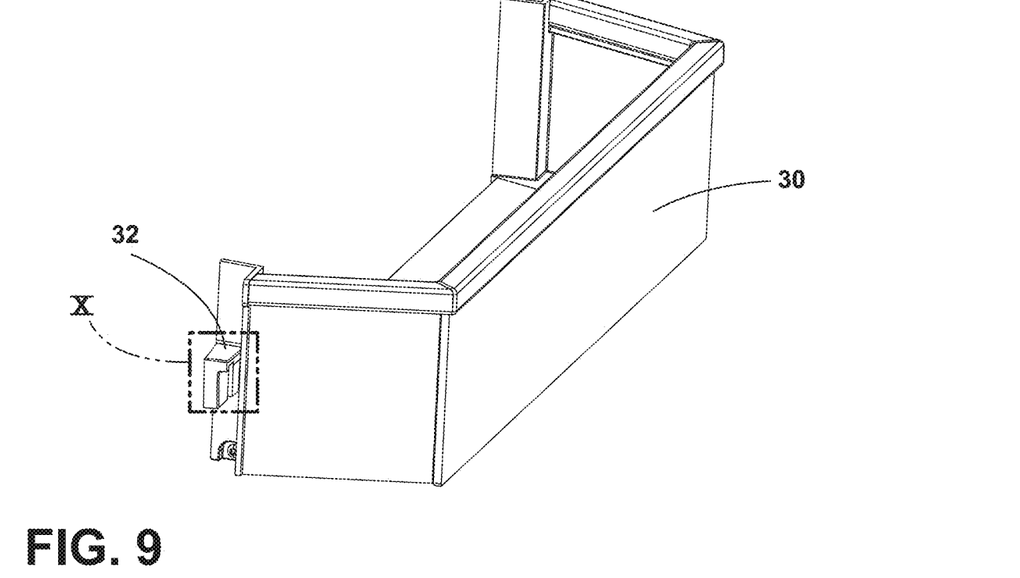
FIG. 9 is a top perspective view of a bin of the present disclosure with a locking feature.
Figure 10:
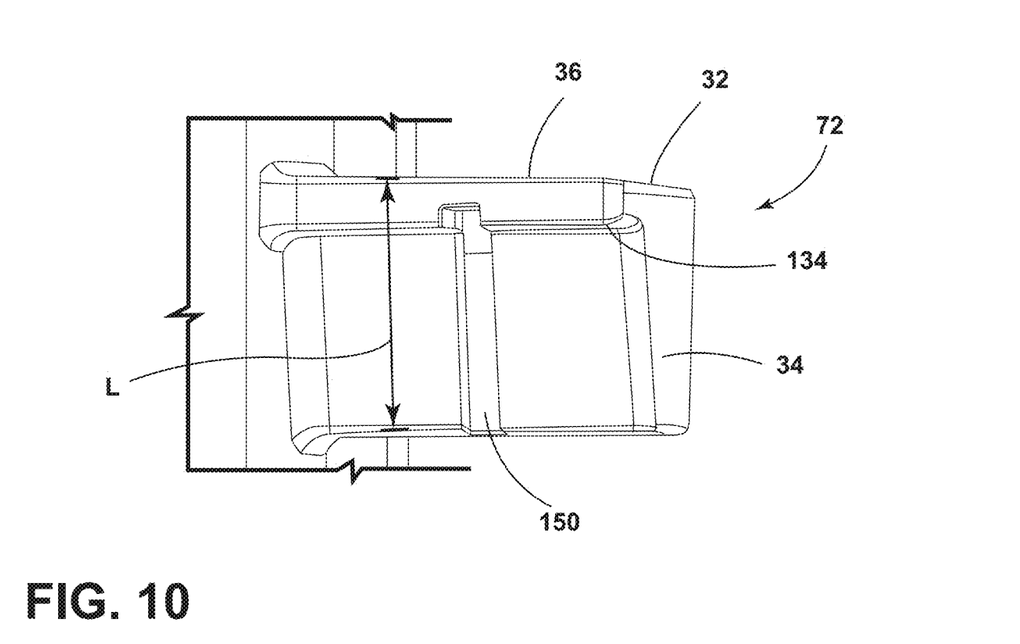
FIG. 10 is an enlarged partial side perspective view of the locking feature of FIG. 9 taken at area X.
Figure 11:
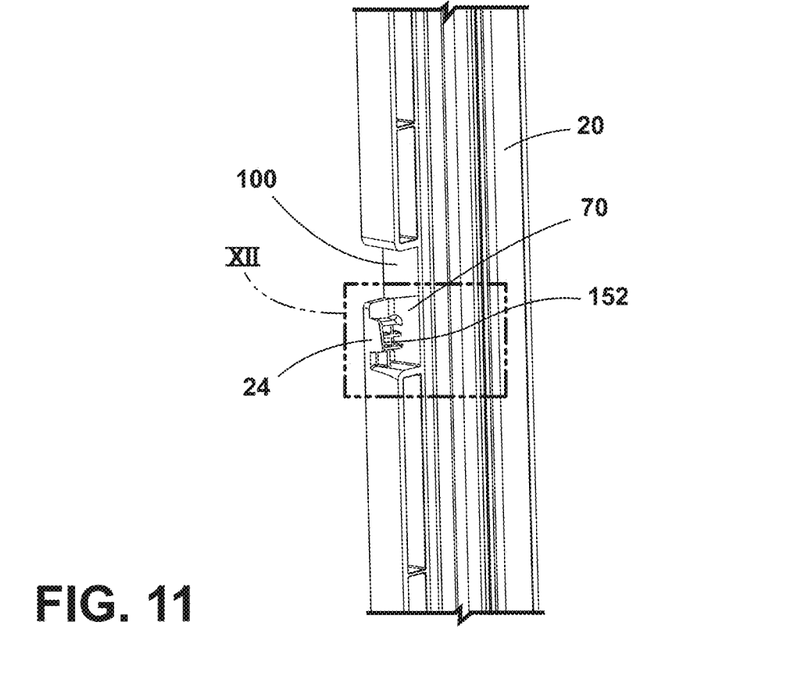
FIG. 11 is an enlarged partial side perspective view of a trim breaker with an engagement feature of the present disclosure.

For example, the first end 128 of the locking feature 32 is wider than the second end 130 of the locking feature 32, whereas the top portion 110 of the engagement feature 24 is narrower than the base portion 28 of the engagement feature 24. The tapered body 34 of the locking feature 32 may have an angled face 132 configured to engage the angular side 26 of the engagement feature 24. As illustrated in FIG. 7, the first end 128 of the locking feature 32 generally extends above the top portion 110 of the engagement feature 24, and the second end 130 of the locking feature 32 extends beneath the base portion 28. It is contemplated that the projection 36 of the locking feature 32 can be defined on the second end 130 of the body 34. As illustrated in FIG. 8, the projection 36 of the locking feature 32 is selectively coupled to the base portion 28 of the engagement feature 24. As mentioned above, the projection 36 extends beneath the base portion 28 of the engagement feature 24 to generally retain the bin 30 relative to the trim breaker 20.

By way of example, not limitation, the projection 36 of the locking feature 32 may overlap the base portion 28 of the engagement feature 24 by approximately 20 to 30 millimeters. Additionally or alternatively, the projection 36 may extend or overlap with the base portion 28 less than 20 millimeters and/or greater than 30 millimeters. The coupling of the projection 36 with the engagement feature 24 secures and generally retains the bin 30 relative to the trim breaker 20. The bin 30 is operable between a locked position and an unlocked position, such that the locked position is defined by the projection 36 being coupled with the base portion 28 of the engagement feature 24. When the bin 30 is being coupled with the trim breaker 20, a downward force $F_1$ is applied to the bin 30 and defined between each of the locking feature 32 and the engagement feature 24. Similarly, to remove the bin 30 from the trim breaker 20, an upward force $F_2$ is operably applied to the bin 30 and is at least partially defined between the locking feature 32 and the engagement feature 24.

It is contemplated that the projection 36 can engage the base portion 28 when a force less than the upward force $F_2$ is applied to the bin 30, such that the projection 36 retains the bin 30 relative the trim breaker 20. Stated differently, the projection 36 is configured to prevent upward movement of the bin 30 until the predetermined upward force $F_2$ is applied. The upward force $F_2$ is a predetermined force sufficient to release the engagement between the projection 36 and the base portion 28 of the engagement feature 24. Similarly, the downward force $F_1$ is a predetermined force configured to overcome the frictional resistance between the locking and engagement features 32, 24 during assembly of the bin 30 with the trim breaker 20. By way of example, not limitation, the downward force $F_1$ may be approximately 90 Newtons. It is contemplated that, once assembled, the locking feature 32 and the engagement feature 24 may define a frictional engagement between the angled face 132 of the locking feature 32 and the angular side 26 of the engagement feature 24. This frictional engagement further assists in the retention of the bin 30 with the trim breaker 20, along with the engagement of the projection 36 and the base portion 28.

With further reference to FIGS. 5-8, the space 108, mentioned above, defined by the engagement feature 24 is configured to receive the projection 36 of the locking feature 32. The space 108, being defined beneath the base portion 28, can be at least partially obstructed with the projection 36. The projection 36 may be lodged with the base portion 28 within the space 108. Additionally or alternatively, the projection 36 may be coupled with the base portion 28 and free of other engagement within the aperture 70. The positioning of the projection 36 within the space 108 is configured to retain the bin 30 in the locked position. As the force $F_1$ is applied to the bin 30 in a downward direction, the projection 36 may engage the angular side 26 of the engagement feature 24 and translate beneath the base portion 28 into the space 108. It is generally contemplated that the projection 36 of the locking feature 32 may define a notch 134 proximate to the second end 130 of the tapered body 34. The angular side 26 and an end 136 of the engagement feature 24 may be selectively received within the notch 134 defined by the projection 36 and the tapered body 34. The notch 134 assists in retaining the bin 30 relative to the trim breaker 20 by engaging the engagement feature 24 while the projection 36 is positioned beneath the base portion 28 of the engagement feature 24.

Figure 12:
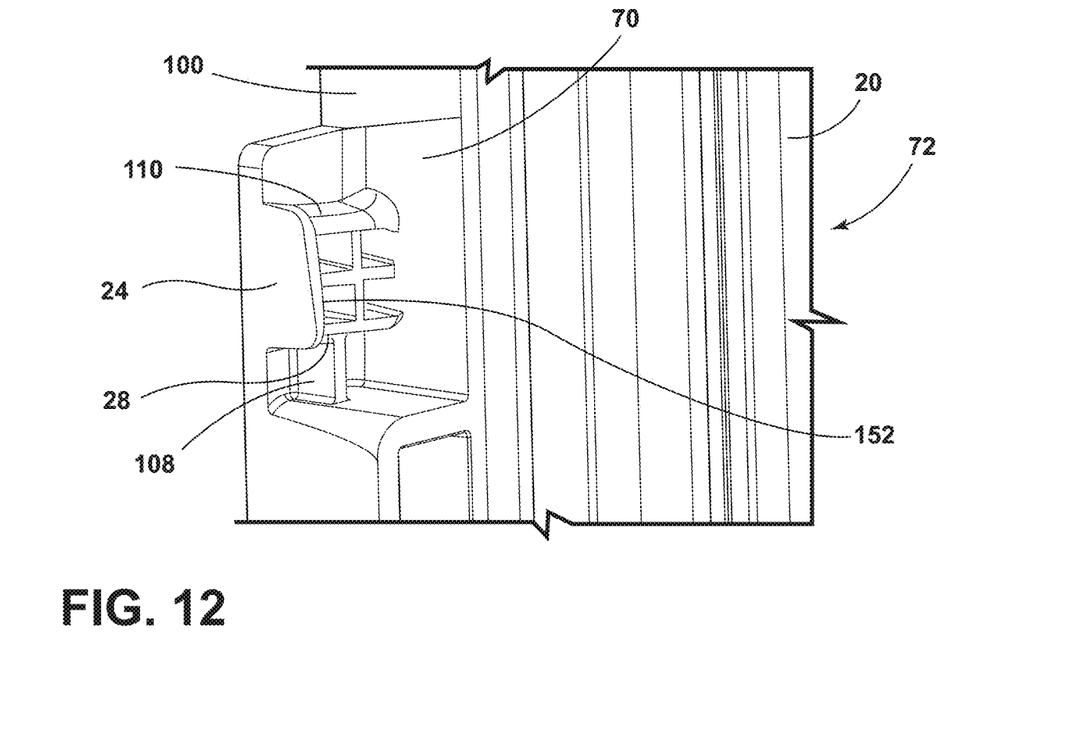
FIG. 12 is an enlarged partial side perspective view of the engagement feature of FIG. 11 taken at area XII.

Referring now to an alternate configuration illustrated in FIGS. 9-12, the body 34 of the locking feature 32 can define a slot 150 along a length L of the body 34. The engagement feature 24 of the trim breaker 20 may correspondingly include a flange 152 that may be selectively disposed within the slot 150 defined by the locking feature 32. As illustrated in FIG. 12, the flange 152 outwardly extends from the angular side 26 of the engagement feature 24. The projection 36 of the locking feature 32 is defined on the first end 128 of the body 34. The projection 36 may also define the notch 134, mentioned above, which generally extends around the top portion 110 of the engagement feature 24. The slot 150 defined along the length L of the body 34 may also extend along the projection 36. The flange 152 of the engagement feature 24 may be disposed in the slot 150, such that the flange 152 is engaged with the projection 36 in the locked position of the bin 30. The configuration illustrated in FIGS. 9-12, assists in laterally retaining the bin 30 relative to the trim breaker 20, such that the flange 152 is retained by the slot 150 defined by the locking feature 32 and the engagement with the projection 36.

The bin 30 is coupled to the trim breaker 20 via the alignment of the flange 152 of the engagement feature 24 with the slot 150 defined by the locking feature 32. The notch 134 can be disposed around the top portion 110 of the engagement feature 24. The notch 134 assists in retaining the bin 30 with the trim breaker 20. In this alternate configuration, the projection 36 extends along the top portion 110 of the engagement feature 24. The flange 152 extends along the body 34 and into the projection 36 within the slot 150.

Referring again to FIGS. 1-12, the bin attachment assembly 72, as described herein generally retains the bin 30 relative to the trim breaker 20, such that lateral and/or vertical movement of the bin 30 is minimized. For example, the engagement of the projection 36 with the base portion 28 of the engagement feature 24 minimizes the potential for accidental adjustment of the bin 30 relative to the trim breaker 20, such that the force $F_2$ is applied to the bin 30 in order to translate the bin 30 from the locked position to the unlocked position. In addition, the angular configuration of each of the locking features 32 and the engagement features 24 maximizes the engagement between the bin 30 and the trim breaker 20 to retain the bin 30. Additionally or alternatively, the slot 150 defined by the body 34 of the locking feature 32 assists in maintaining the lateral retention of the bin 30. The engagement of the locking feature 32 with the flange 152 of the engagement feature 24 minimizes forward and backward movement of the bin 30 relative to the trim breaker 20.

The invention disclosed herein is further summarized in the following paragraphs and is further characterized by combinations of any and all of the various aspects described therein.

According to one aspect of the present disclosure, a vacuum insulated door for an appliance includes a first panel, a second panel that is operably coupled to the first panel to define an insulating cavity, and a trim breaker that is operably coupled to each of the first panel and the second panel. The trim breaker includes a frame and an engagement feature. The engagement feature includes an angular side and a base portion. The vacuum insulated door further includes a bin that is operably coupled to the trim breaker proximate to the second panel. The bin includes a locking feature that is selectively coupled to the engagement feature. The locking feature includes a body and a projection that extends from an end of the body.

According to another aspect, a projection of a locking feature is selectively coupled to a base portion of an engagement feature.

According to another aspect, a bin is operable between a locked position and an unlocked position. The locked position is defined by a projection of a locking feature being coupled with a base portion of an engagement feature.

According to another aspect, a projection of a locking feature overlaps a base portion of an engagement feature that is approximately 20 to 30 millimeters.

According to another aspect, a locking feature includes a first end and a second end. The first end has a width greater than a width of the second end.

According to another aspect, a body of a locking feature defines a slot along a length of the body.

According to another aspect, an engagement feature of a trim breaker includes a flange that is selectively disposed within a slot defined by a locking feature.

According to another aspect of the present disclosure, a vacuum insulated structure includes a first panel and a second panel. The first panel is coupled to the second panel to define an insulating cavity. A trim breaker is operably coupled to each of the first panel and a second panel. The trim breaker includes a first engagement feature and a second engagement feature. A space is defined proximate each of the first engagement feature and the second engagement feature. The first engagement feature and the second engagement feature each include an angular side and a base portion. A first locking feature is at least partially disposed within the space defined by the first engagement feature and is operably coupled to the first engagement feature. A second locking feature is at least partially disposed within the space defined by the second engagement feature and is operably coupled to the second engagement feature. The first locking feature and the second locking feature are configured to couple a bin to the trim breaker.

According to another aspect, a first locking feature and a second locking feature each include a projection that is selectively coupled with a base portion of a first engagement feature and a second engagement feature, respectively, of a trim breaker.

According to another aspect, a force is defined between a first locking feature and a first engagement feature and between a second locking feature and a second engagement feature, respectively, when a bin translates between a locked position and an unlocked position.

According to another aspect, a first locking feature and a second locking feature each define a first end and a second end. The first locking feature and the second locking feature each define a tapered configuration between the first end and the second end.

According to another aspect, a projection of a first locking feature and a second locking feature is defined on a second end of each of the first locking feature and the second locking feature, respectively.

According to another aspect, a first locking feature and a second locking feature each include a body that defines a slot along a length thereof.

According to another aspect, a first engagement feature and a second engagement feature each include a flange that extends from an angular side. The flange of each of the first engagement feature and the second engagement feature is selectively disposed within the slot defined by a first locking feature and a second locking feature.

According to yet another aspect of the present disclosure, a bin attachment assembly for a vacuum insulated door includes a trim breaker that includes a frame and at least one engagement feature. The frame defines an aperture in which the at least one engagement feature is disposed. The bin attachment assembly further includes at least one locking feature that is selectively coupled to the trim breaker via the at least one engagement feature. The at least one locking feature includes a tapered body and a projection that extends from an end of the tapered body. The bin attachment assembly further includes a bin that is coupled to the trim breaker via the at least one locking feature.

According to another aspect, at least one engagement feature of a trim breaker includes a first engagement feature and a second engagement feature. At least one locking feature includes a first locking feature and a second locking feature that are operably coupled to the first engagement feature and the second engagement feature, respectively.

According to another aspect, at least one engagement feature further defines a space within an aperture. A projection of at least one locking feature is disposed within the space and is configured to retain a bin in a locking position.

According to another aspect, at least one locking feature defines a slot along a length of a tapered body. At least one engagement feature includes a flange that is selectively disposed within a slot that is defined by the at least one locking feature.

According to another aspect, a projection of at least one locking feature defines a notch that is proximate an end of a tapered body. An angled side of the at least one engagement feature is selectively received within and engaged with the notch that is defined by the at least one locking feature.

According to another aspect, at least one engagement feature includes a base portion. A projection of at least one locking feature is selectively coupled with the base portion to retain a bin that is relative to a trim breaker.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated door for an appliance, comprising:
   a first panel;
   a second panel operably coupled to the first panel to define an insulating cavity;
   a trim breaker operably coupled to each of the first panel and the second panel, the trim breaker including a frame and an engagement feature, wherein the engagement feature includes an angular side and a base portion; and
   a bin operably coupled to the trim breaker proximate to the second panel, the bin including a locking feature selectively coupled to the engagement feature, wherein the locking feature includes a body that defines a slot along a length of the body and a projection extending from an end of the body, and wherein the engagement feature of the trim breaker includes a flange selectively disposed within the slot defined by the locking feature.

2. The vacuum insulated door of claim 1, wherein the projection of the locking feature is selectively coupled to the base portion of the engagement feature.

3. The vacuum insulated door of claim 2, wherein the bin is operable between a locked position and an unlocked position, and wherein the locked position is defined by the projection of the locking feature being coupled with the base portion of the engagement feature.

4. The vacuum insulated door of claim 1, wherein the projection of the locking feature overlaps the base portion of the engagement feature approximately 20 to 30 millimeters.

5. The vacuum insulated door of claim 1, wherein the locking feature includes a first end and a second end, and wherein the first end has a width greater than a width of the second end.

6. A vacuum insulated structure, comprising:
   a first panel and a second panel, the first panel coupled to the second panel to define an insulating cavity;
   a trim breaker operably coupled to each of the first panel and the second panel, the trim breaker including a first engagement feature and a second engagement feature, wherein a space is defined proximate each of the first engagement feature and the second engagement feature, and wherein the first engagement feature and the second engagement feature each include an angular side and a base portion;
   a first locking feature at least partially disposed within the space defined by the first engagement feature and operably coupled to the first engagement feature, the first locking feature including a slot extending along a length thereof, wherein a first flange extends from the angular side of the first engagement feature and is selectively disposed within the slot defined by the first locking feature; and a second locking feature at least partially disposed within the space defined by the second engagement feature and operably coupled to the second engagement feature, the second locking feature including a slot extending along a length thereof, wherein a second flange extends from the angular side of the second engagement feature and is selectively disposed within the slot defined by the second locking feature, and wherein the first locking feature and the second locking feature are configured to couple a bin to the trim breaker.

7. The vacuum insulated structure of claim 6, wherein the first locking feature and the second locking feature each include a projection selectively coupled with the base portion of the first engagement feature and the second engagement feature, respectively, of the trim breaker.

8. The vacuum insulated structure of claim 7, wherein the first locking feature and the second locking feature each define a first end and a second end, and wherein the first locking feature and the second locking feature each define a tapered configuration between the first end and the second end.

9. The vacuum insulated structure of claim 8, wherein the projection of each of the first locking feature and the second locking feature is defined on the second end of each of the first locking feature and the second locking feature, respectively.

10. The vacuum insulated structure of claim 6, wherein a force is defined between the first locking feature and the first engagement feature and between the second locking feature and the second engagement feature, respectively, when the bin translates between a locked position and an unlocked position.

11. A bin attachment assembly for a vacuum insulated door, the bin attachment assembly comprising:

a trim breaker including a frame and at least one engagement feature, the frame defining an aperture in which the at least one engagement feature is disposed;

at least one locking feature selectively coupled to the trim breaker via the at least one engagement feature, the at least one locking feature including a tapered body and a projection extending from an end of the tapered body, wherein the projection of the at least one locking feature defines a notch proximate the end of the tapered body, and wherein an angled side of the at least one engagement feature is selectively received within and engaged with the notch defined by the at least one locking feature; and a bin operably coupled to the trim breaker via the at least one locking feature.

12. The bin attachment assembly of claim 11, wherein the at least one engagement feature of the trim breaker includes a first engagement feature and a second engagement feature, and wherein the at least one locking feature includes a first locking feature and a second locking feature operably coupled to the first engagement feature and the second engagement feature, respectively.

13. The bin attachment assembly of claim 11, wherein the at least one engagement feature further defines a space within the aperture, and wherein the projection of the at least one locking feature is disposed within the space and is configured to retain the bin in a locked position.

14. The bin attachment assembly of claim 11, wherein the at least one locking feature defines a slot along a length of the tapered body, and wherein the at least one engagement feature includes a flange selectively disposed within the slot defined by the at least one locking feature.

15. The bin attachment assembly of claim 11, wherein the at least one engagement feature includes a base portion, and wherein the projection of the at least one locking feature is selectively coupled with the base portion to retain the bin relative the trim breaker.

* * * * *